Patented Nov. 20, 1928.

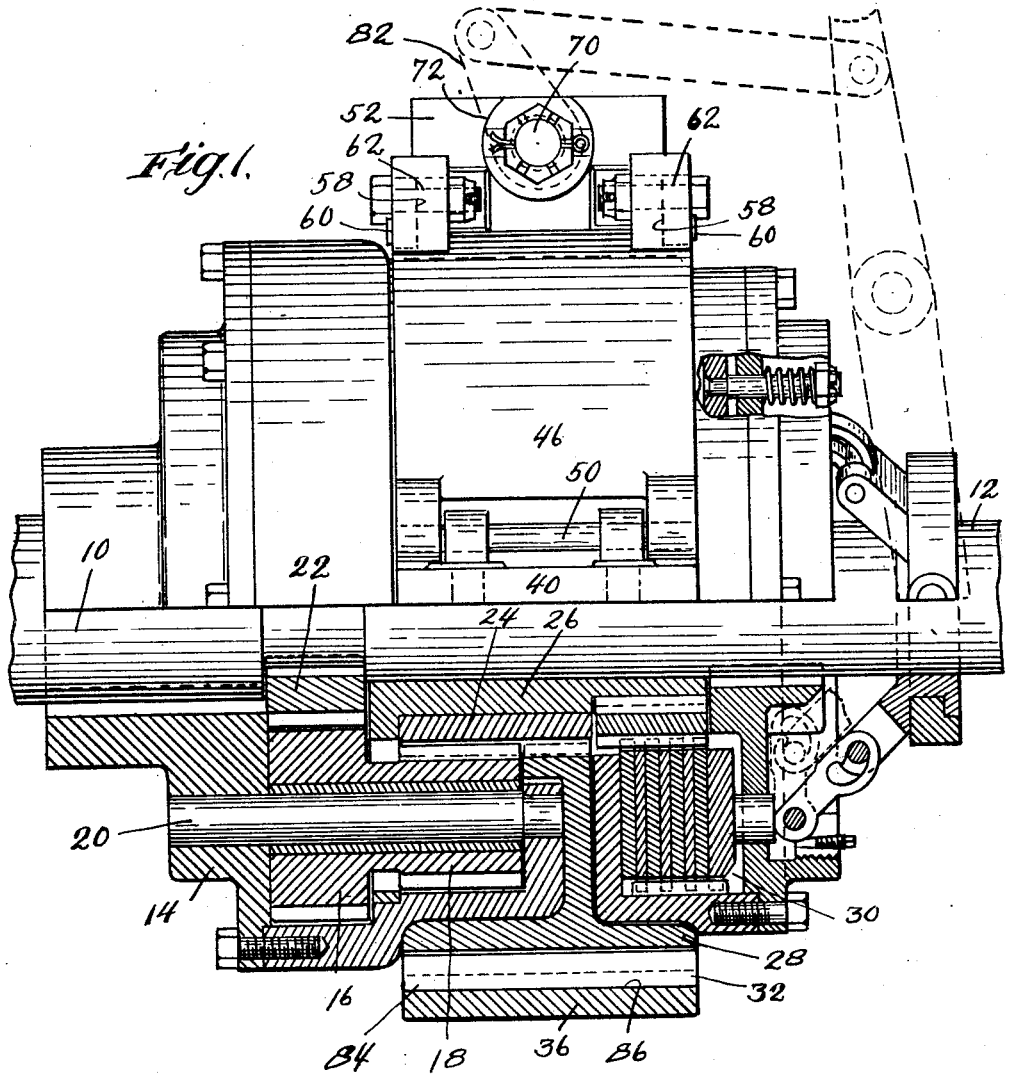

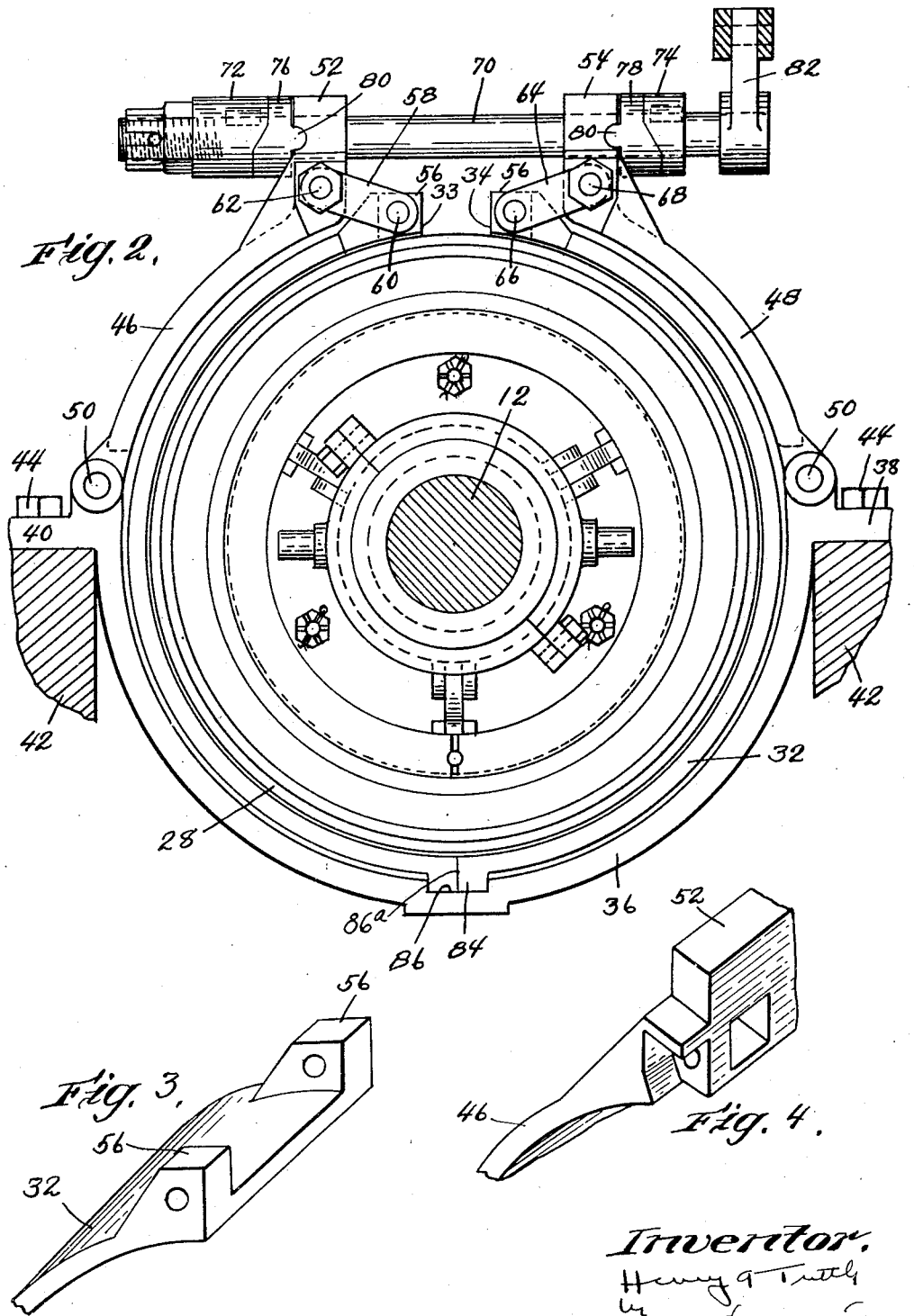

1,692,006

UNITED STATES PATENT OFFICE.

HENRY A. TUTTLE, OF UPTON, MASSACHUSETTS.

BRAKE MECHANISM.

Application filed April 4, 1927. Serial No. 180,704.

This invention relates to brake mechanisms especially adapted for reversing gearings.

A reversing gearing usually includes aligned driving and driven shafts with gearing mechanism surrounding the ends of the shafts and connecting them for reverse drive. The gearing mechanism includes a gear carrier surrounding the shafts and having a rotatable bearing on at least one of them. A brake drum is associated with the gearing and gear carrier and a brake band encircles the brake drum to hold it stationary to set the gearing for reverse drive. The brake band is flexible and the proximate ends thereof, which are disposed usually above the drum, are adapted to be moved toward each other to contract the brake band into frictional engagement with the drum. The brake band usually is provided with laterally extended feet on the opposite sides thereof and in the horizontal plane including the axis of the shafts. The feet are adapted to bear upon side beams which are disposed on opposite sides of the gearing and are adapted to support the brake band against rotation. The feet are loose on the beams so that they are free to move thereon to permit the band to be contracted and expanded. When the brake band is contracted about the rotating brake drum one of the feet is caused to bear forcibly upon its side beam whereby the driving strain on the band, acting through the leverage of the band-foot on its support, tends to move the driving shafts and the gearing bodily upward, thereby tending to move the shafts out of alignment and so to set up undue strains in the gearing and produce rapid wear of the bearings.

It is an object of this invention to provide brake mechanism especially adapted for reversing gearing of the type above described so constructed and arranged that there is no unbalanced force of any material magnitude which tends to move the gearing elements laterally when the brake is set, thus to preserve the alignment of the shafts and the gearing elements and to reduce the wear on and increase the life of the parts.

A further object of the invention is the provision of brake mechanism including a flexible brake band having means in engagement with a plurality of peripherally spaced portions thereof to hold it against rotation, the holding means being so arranged that the leverage exerted by the brake band on one of the holding means to displace the brake drum laterally is offset by the oppositely directed leverage of other holding means whereby to balance the force on the brake drum.

Another object of the invention is the provision of supporting means for the proximate ends of the brake band so arranged that they operate to move the ends of the band toward each other and at the same time inwardly toward the drum when the band is contracted about the drum.

A further object of the invention is the provision of operating mechanism for the brake band so arranged that the engaging pressures between both end portions of the band and the drum are approximately equal regardless of the direction of rotation of the drum.

A yet further object is generally to improve the construction and operation of gearing and brake mechanism.

Fig. 1 is a side elevation partly in section of a reversing gearing embodying the invention.

Fig. 2 is a rear view of the reversing gearing of Fig. 1.

Figs. 3 and 4 are perspective details illustrating the construction at the ends of a band-supporting link and the band, respectively.

As here shown, the reversing gearing of Fig. 1 includes the aligned driving and driven shafts 10 and 12 respectively. A gear carrier 14 is fixed to the end of the driving shaft and overlies the driven shaft. Sets of connected pinion gears 16 and 18 respectively are journalled on pins 20 carried by the gear carrier and the gears 16 thereof are in constant mesh with a spur gear 22 fixed to the end of the driven shaft. A spur gear 24 is loose on the hub 26 of the gear carrier and is in constant mesh with the pinions 18. Said loose spur gear 24 is connected with a brake drum 28 which is adapted to be held stationary to set the gearing for the reverse drive of the driven shaft.

Clutch mechanism 30 is provided to connect the driving and driven shafts for forward drive.

The gearing herein shown is claimed in my co-pending application Serial No. 625,390, filed March 15, 1923 on which Patent No. 1,646,127, was issued October 18, 1927. Certain features of the clutch operating mechanism are shown and claimed in my concurrently filed application Serial No. 180,705.

Brake mechanism is provided to engage the brake drum 28 and hold it stationary to secure reverse drive. The brake mechanism includes a flexible brake band 32 which encircles said brake drum and is normally free of contact therewith. The proximate ends 33 and 34 of the brake band are disposed above the brake band and are adapted to be moved toward each other to contract the brake band about the drum. The resiliency of the band is adapted to free it from the drum when the pressure on the ends of the band is released. The brake band is supported by means including a saddle comprising a semi-circular shaped strap 36 which is disposed under the brake band. Said saddle is provided with outstanding feet 38 and 40 respectively which are adapted to rest upon supporting beams 42 disposed at the sides of the reversing gearing. Said feet are rigidly secured to the side beams by suitable means as bolts 44. The free ends of the brake band are also supported from the side beams by means of supporting links 46 and 48 respectively which links are in the form of flat arcuate-shaped plates pivoted by pins 50 to the lugs 38 and 40 of the saddle 36 and extended upwardly on opposite sides of and overlie the upper portions of the brake band. The proximate ends of said links 46 and 48 are provided with upstanding ears 52 and 54 respectively. The proximate ends of the brake band are provided with upstanding lugs 56. Connecting links 58 are pivoted by bolts 60 to the lugs 56 of the brake band and are also pivoted by bolts 62 to the upstanding lugs 52 of the link 46. Similar links 64 are pivotally connected by bolts 66 to the lugs of the other end of the brake band and said links are pivotally connected by bolts 68 to the end of the link 48.

Operating mechanism is provided to move the supporting links 46 and 48 toward each other whereby to apply pressure through links 58 and 64 to the ends of the brake band thereby to set the brake. Brake operating mechanism includes a shaft 70 which is loosely extended through and has bearings in the ears 52 and 54 of the supporting links above the ends of the brake band. Cam discs 72 and 74 are keyed or otherwise secured to said shaft and cooperate with cam discs 76 and 78 which are loose on said shaft. Said latter cam discs are provided with projections 80 which are received in grooves in the opposite faces of the lugs 52 and 54 whereby to lock said cam discs against rotation therewith; and said grooves and projections provide rocking or self-aligning supports for said latter cam discs. The cooperating cam discs are so arranged that when said shaft 70 is rotated, the cam surfaces of the discs 72 and 74 ride upon the inclined surfaces of the discs 76 and 78 whereby to force the supporting links inwardly, thereby to set the brake.

Said shaft may be rotated by any suitable mechanism which may include the arm 82 fixed to the end of said shaft.

The lower end of the brake band opposite the proximate ends thereof is provided with an outstanding projection 84 which is received loosely within a corresponding recess 86 in the lower portion of the saddle 36 whereby to hold the lower portion of the band against rotation.

When the brake mechanism above described is operated to contract the brake band into holding engagement with the brake drum, the brake band has a tendency to rotate say in a clockwise direction, Fig. 2. Rotation of the band, however, is prevented by the connection between the projection 84 thereof and the recess 86 in the saddle. Since the saddle is securely bolted to both side beams 42 rotation of the brake band and tilting of the saddle is prevented. Rotation of the brake band is also prevented by the link 48 which holds the free end of the band in contact with the brake drum and against rotation. The arrangement of the various holding means is such that the leverage of the brake band against one holding means is substantially counterbalanced by the leverage of the other holding means so that there is no material tendency for lateral displacement of the gearing in any direction and consequently there is no undue strains on and wearing of the parts.

The supporting means for the free ends of the brake band also serves to apply equal pressure on both ends of the band for the tendency of, say, the end 34 of the band to move toward the right, due to the driving force on the brake drum, serves to move the other end of the brake band more strongly against the brake drum through the interposition of the actuating shaft 70 connecting the ends of the band. The links 58 and 64 are downwardly inclined so that the inward movement of the links 46 and 48 forces the ends of the brake band inwardly as well as moving them toward each other.

It will be noted that the brake band is composed of separate right and left hand sections, or is split along the vertical line 86ª, Fig. 2, which sections are held together by the saddle 36. With this arrangement the band may be removed from encircling relation about the drum by moving it endwise until it is clear of the saddle, whereupon the sections will separate and each can be removed independently on opposite sides of the shaft.

I claim:

1. The combination of aligned driving and driven shafts, mechanism surrounding and carried by said shafts, including a brake drum, a brake band engageable with said drum to hold it stationary, and operating mechanism for said brake band including means to support said brake band, and also said mechanism and shafts, against lateral displacement.

2. The combination of aligned driving and driven shafts, mechanism surrounding and carried by said shafts, including a brake drum, and brake mechanism operating on said brake drum and having provision for supporting said mechanism and shafts against lateral displacement when in operative engagement with said brake drum.

3. The combination of aligned driving and driven shafts, gearing mechanism connecting said shafts including a gear carrier for said gearing surrounding and having a bearing on at least one of said shafts, and brake mechanism including a brake drum associated with said gearing, a brake band surrounding said drum to hold it stationary, and operating mechanism for said brake band including means to support said mechanism and shafts against lateral displacement when said brake mechanism is set.

4. The combination of aligned driving and driven shafts, mechanism surrounding and carried by said shafts, including a brake drum, a brake band engageable with said drum to hold it stationary, and operating mechanism for said brake band arranged to hold said band in contact with the rotating drum without any material tendency to displace said shafts and mechanism laterally.

5. Brake mechanism comprising the combination of a rotatable brake drum, a brake band encircling said drum and having proximate free ends, links pivotally connected with said free ends and overlying portions of said brake band and having pivotal supporting means therefor disposed on opposite sides of said band, and actuating mechanism engageable with said links to move them about their pivots.

6. Brake mechanism including the combination of a rotatable brake drum, a brake band encircling said drum and having proximate free ends located above said drum, links extended upwardly on opposite sides of said brake band and having pivotally-supported lower ends and pivotal connections at their upper ends with the proximate ends of said brake band, and brake actuating mechanism engageable with the upper ends of said links to effect inward and outward movements thereof, whereby to contract and expand said brake band.

7. Brake mechanism including the combination of a rotatable brake drum, a brake band encircling said drum and having proximate free ends, links disposed mainly at one side of said free ends and having pivotal connections at their similar ends with the ends of the brake band, and having pivotal supports for their other ends, and brake actuating mechanism engageable with said links to move them inwardly and outwardly whereby to contract and expand said brake band.

8. Brake mechanism comprising the combination of a brake drum, a brake band encircling said drum and having proximate free ends disposed above said drum, supporting means for said brake drum including links extended upwardly on opposite sides of said brake band and having pivotal connections at their upper ends with the ends of said brake band and having pivotal supports for their lower ends, a fixed support engageable with the intermediate portion of said brake band below said links to hold said band against rotation, and brake operating mechanism engageable with the upper portions of said links.

9. Brake mechanism comprising the combination of a rotatable brake drum, a brake band encircling said drum and having proximate free ends disposed thereabove, supporting links having pivotal connections with supports on opposite sides of said brake band and extended upwardly thereabout and having links pivotally connecting their upper ends with the ends of said brake band, and brake operating mechanism operable to move the ends of said brake band toward each other.

10. Brake mechanism comprising the combination of a rotatable brake drum, a brake band encircling said drum and having proximate free ends disposed thereabove, supporting links having pivotal connections with supports on opposite sides of said brake band and extended upwardly thereabout and having links pivotally connecting their upper ends with the ends of said brake band, a fixed support engageable with an intermediate portion of said brake band to hold it against rotation, and brake operating mechanism operable to move the ends of said brake band toward each other.

11. Brake mechanism comprising the combination of a rotatable brake drum, a brake band encircling said drum and having proximate free ends disposed thereabove, supporting links having pivotal connections with supports on opposite sides of said brake band and extended upwardly thereabout and having links pivotally connecting their upper ends with the ends of said brake band, and brake operating mechanism operable to move the ends of said brake band toward each other, said brake operating mechanism including an operating shaft extended loosely between the upper ends of said supporting links, and sets of cooperating cam members connected with said shaft and with said links arranged to move said links inwardly to set the brake.

12. In a brake mechanism, the combination of a rotatable brake drum, a brake band encircling said drum, and a saddle surrounding the lower portion of said drum having means at its ends to secure it rigidly to a support and having means intermediate its ends engageable with the brake band to hold it against rotation.

13. In a brake mechanism, the combination of a rotatable brake drum, a brake band encircling said drum, and a saddle surrounding the lower portion of said drum having means at its ends to secure it rigidly to a support, said brake band and said saddle having a loosely intermeshing connection holding said brake band against rotation.

14. Brake mechanism comprising the combination of a rotatable brake drum, a brake band encircling said drum and having proximate free ends located thereabove, a saddle encircling the lower portion of said brake band, and having means located on opposite sides of said band providing a rigid support for said saddle, supporting links pivoted at their lower ends to said saddle and extended upwardly above said brake band and having pivotal connections at their upper ends with said brake band, and brake operating mechanism operable to contract said band.

15. Brake mechanism comprising the combination of a rotatable brake drum, a brake band encircling said drum and having proximate free ends located thereabove, a saddle encircling the lower portion of said brake band, supporting means for said saddle located at the sides of said brake band, supporting links pivoted to said saddle and extended upwardly on opposite sides of said brake band, links pivotally connecting the upper ends of said supporting links with the proximate ends of said brake band, and brake operating mechanism engageable with the upper ends of said supporting links to move them toward each other.

16. Brake mechanism comprising the combination of a rotatable brake drum, a brake band encircling said drum and having proximate free ends located thereabove, a saddle encircling the lower portion of said brake band, supporting means for said saddle located at the sides of said brake band, supporting links pivoted to said saddle and extended upwardly on opposite sides of said brake band, links pivotally connecting the upper ends of said supporting links with the proximate ends of said brake band, and brake operating mechanism comprising an operating shaft extended between and carried by the upper ends of said supporting links, said supporting links having cooperating cam members operable to move the ends of said supporting links inwardly toward each other upon the rotation of said shaft.

17. Brake mechanism comprising the combination of a rotatable brake drum, a brake band encircling said drum and having proximate free ends disposed thereabove, supporting links extended upwardly on opposite sides of said brake band, fixed supporting means having pivotal connections with the lower ends of said supporting links, links pivotally connecting the upper ends of said supporting links with the proximate ends of said brake bands, said latter links being downwardly inclined toward said brake band, and brake operating mechanism engageable with the upper ends of said supporting links operable to move them inwardly to contract said brake band about said drum.

18. Brake operating mechanism comprising the combination of a brake drum, a brake band encircling said drum and having proximate free ends located thereabove, a saddle encircling the lower portion of said brake band and having laterally-extended feet, supports for said feet, means rigidly securing said feet and supports together, supporting links pivoted to said feet and extended upwardly on opposite sides of said brake band, links pivotally connecting the upper ends of said supporting links with the proximate ends of said brake band, an operating shaft rotatable in the upper ends of said supporting links, sets of cam members fixed to said links arranged to effect outward and inward movements of said supporting links upon the rotation of said shaft, whereby to operate the brake mechanism, and said brake band and said saddle having a loosely interlocking connection located beneath said brake drum to hold said brake band against rotation.

19. Brake mechanism comprising the combination of a brake drum, a brake band encircling said drum composed of separte right and left hand sections, and a fixedly-supported saddle disposed adjacent said brake band and having means loosely engaging both sections to hold them in cooperative relation while permitting them to move freely toward and away from said drum.

20. Brake mechanism comprising the combination of a brake-drum, a brake band encircling said drum composed of two opposed complementary sections having opposed lugs at their ends, and a saddle disposed adjacent said brake band having a recess in which said opposed lugs are received loosely so that the bands at the lugs can move freely toward and away from said drum.

21. Brake mechanism comprising the combination of a brake drum, a brake band encircling said drum, and a saddle for supporting said brake band against rotation, said brake band having an axially-disengageable interlocking connection with said saddle.

22. Brake mechanism comprising the combination of a brake drum, a brake band encircling said drum, and means to restrain said brake band against rotation including a fixed support disposed adjacent said band, said band having an axially-disengageable interlocking connection with said support.

23. Brake mechanism comprising the combination of a brake drum, a brake band encircling said drum comprising opposed sections having abutting ends, formed with outstanding lugs thereat, and supporting means for said brake band adapted to hold it against rotation having a groove in which said opposed lugs are received, said lugs being movable in an axial direction free from engagement with said recess.

In testimony whereof, I have signed my name to this specification.

HENRY A. TUTTLE.